[19] United States Patent
Brewer

[11] 4,157,726
[45] Jun. 12, 1979

[54] TIRE SAFETY SUPPORT

[75] Inventor: Wendell N. Brewer, Atwater, Ohio

[73] Assignee: The Goodyear Tire & Rubber Company, Akron, Ohio

[21] Appl. No.: 850,037

[22] Filed: Nov. 9, 1977

Related U.S. Application Data

[63] Continuation of Ser. No. 677,485, Apr. 15, 1976, abandoned.

[51] Int. Cl.$^2$ ............................................. B60C 17/00
[52] U.S. Cl. ............................... 152/330 RF; 152/158
[58] Field of Search ............. 152/330 RF, 330 L, 339, 152/340, 158, 399, 400

[56] References Cited

U.S. PATENT DOCUMENTS

| 3,085,615 | 4/1963 | Sanderson | 152/340 |
| 3,219,092 | 11/1965 | Howard | 152/340 |
| 3,225,811 | 12/1965 | Hawkes | 152/340 |
| 3,942,571 | 3/1976 | Kraft | 152/330 RF X |

Primary Examiner—Joseph F. Peters, Jr.
Assistant Examiner—D. W. Underwood
Attorney, Agent, or Firm—Frederick K. Lacher; J. A. Rozmajzl

[57] ABSTRACT

A segmental annular tire safety support for mounting on a wheel rim to support a pneumatic tire in the deflated condition. The safety support includes a segmental curved member having a generally cylindrical radially outer supporting surface of revolution with a substantially constant radius circumferentially of the tire safety support. The ends of the curved member have radially outer end surfaces which are relatively flat and are spaced from the axis of the support a distance less than the length of the radius of the outer supporting surface of the curved member to reduce the stresses generated at the end edges and to provide warning vibrations and noise during operation of the tire in the deflated condition.

5 Claims, 4 Drawing Figures

continues

TIRE SAFETY SUPPORT

This is a continuation of application Ser. No. 677,485 filed Apr. 15, 1976, now abandoned.

This invention relates to a novel and improved annular tire safety support mounted on a drop center wheel rim to support a pneumatic tire in the deflated condition. Annular safety supports for mounting on a wheel rim inside a tire have been made of materials permitting deflection of the support to minimize shock to the ball joints and other components of the vehicle. The annular supports have been made in two segments in order to pass the segments through the beads of the tire and mount them in the wheel well.

It has been found that the support segments deflect more at the ends and the ends have been made heavier to resist this deflection. Also, in some applications, a radially extending bracket has been mounted on the annular support with a supporting surface spaced radially inward from the ends to limit the deflection of the ends. A problem has still continued to exist because of the high stresses experienced at the ends of the annular safety support segments during operation with the tire in the deflated condition.

As the tire and annular safety support rotate, the loading on the support moves along one segment of the support and appears at the end of an adjoining segment. Because the segment carrying the load is deflected, the edge of the adjoining segment projects radially outward beyond the edge of the load-carrying segment so that as the adjoining segment comes into load-bearing position, the load will initially be concentrated at the edge and a very high stress will be experienced which may result in failure within the intermediate portion of the adjoining segment.

Another problem with the annular safety supports of this type is that the cushioning provided during operation of the tire in the deflated condition is so effective that the driver of the vehicle may not be aware the tire is operating in the deflated condition and accordingly may operate the vehicle at such high speeds and for such a period of time that the tire and annular support will be damaged.

An object of this invention is to provide an annular safety support segment having a construction wherein the stresses generated at the ends of the segments are mitigated sufficiently to prevent failure.

Another object of the invention is to provide for generation of sufficient vibration and noise during operation to warn the driver of the deflated condition of the tire.

Still another object is to provide an annular support segment having end surfaces for receiving the load transferred from an adjoining support segment to distribute the load transferred from the adjoining support segment during rotation of the annular support and tire in the deflated condition.

A further object is to provide an annular support segment having end edges of a different radius than the radius of the supporting surface to reduce the stresses generated in the edges during operation of the tire in the deflated condition.

A still further object of the invention is to provide end surfaces of the annular support segments having a different contour than the radially outer surfaces of the segments between the ends to mitigate the stresses and provide vibrations and noise for warning the driver of the deflated condition of the tire.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
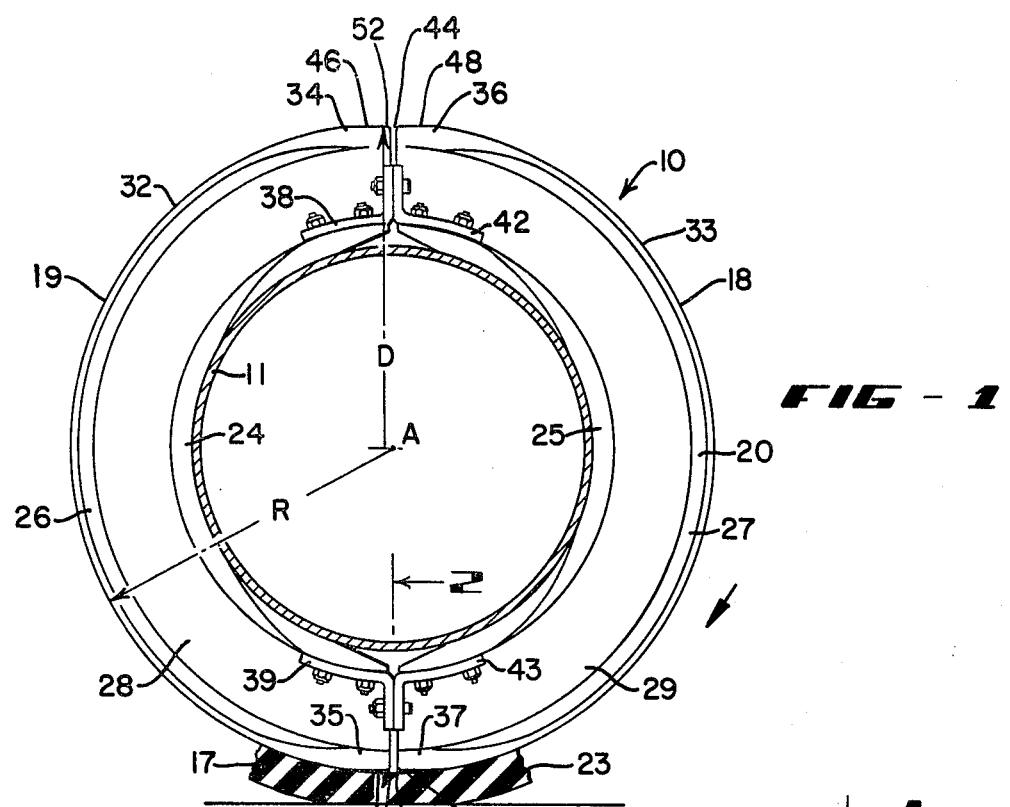
FIG. 1 is a cross-sectional view taken along the plane of line 1—1 of FIG. 2 showing a side elevation of one embodiment of the tire support of the invention mounted on a rim.
Figure 2:
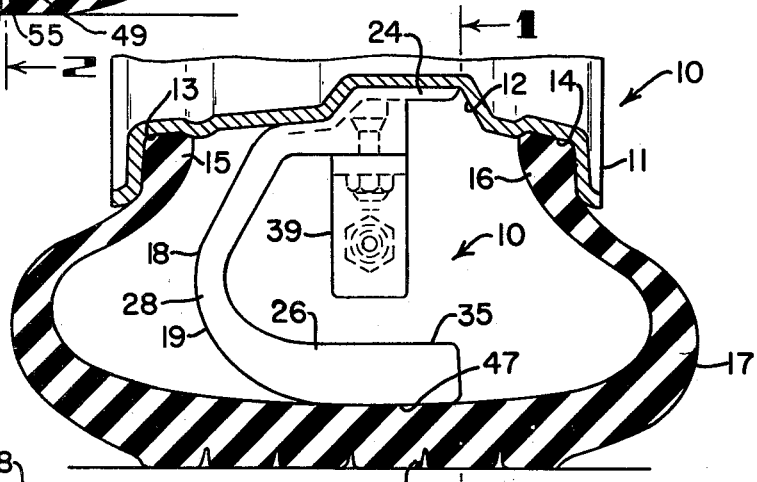
FIG. 2 is is a cross-sectional taken along the plane of line 2—2 of FIG. 1 and showing the tire mounted on the rim in the deflated condition.
Figure 3:
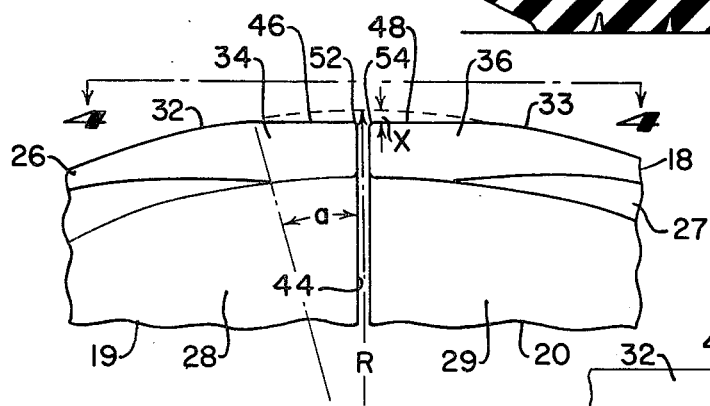
FIG. 3 is an enlarged fragmentary view like FIG. 1 showing the construction of the support segments at the ends without the tire.

Referring to the drawings and particularly FIGS. 1 and 2, a tire safety support assembly 10 is shown mounted on a vehicle wheel rim 11 which may be of the drop center type. The wheel rim 11 has a drop center wheel well 12 with bead seat portions 13 and 14 on each side thereof for receiving tire bead portions 15 and 16, respectively, of a tire 17 shown in FIGS. 1 and 2 in the deflated condition.

The safety support assembly 10 includes a segmental annular support member 18 having a substantially C-shaped cross section as shown in FIG. 2 and is divided into segments such as curved members 19 and 20. Each of the curved members 19 and 20 is a single unitary piece preferably of a generally rigid material such as fiberglass reinforced plastic. Other materials may be used if they have the required physical properties and especially the radial deflection for cushioning the vehicle when the tire 17 is deflated and in engagement with the support member 18, as shown in FIGS. 1 and 2. The tire 17 has a tread portion 23 which in the inflated condition is spaced from the support member 18 a distance such that there will be no contact with the tire under normal driving conditions including deflections caused by bumps, chuck holes or other obstructions in the road. The tread portion 23 of the deflated tire 17 as shown in FIGS. 1 and 2, contacts the support member 18 at the underside of the wheel when there is substantial underinflation or deflation of the tire. The rim 11 is mounted on a wheel (not shown) and rotatable about an axis A shown in FIG. 1.

Each of the curved members 19 and 20 have rim-engaging portions 24 and 25, respectively, for seating in the wheel well 12 of the rim 11. Radially outward of the rim-engaging portions 24 and 25 are tire support portions 26 and 27 of the curved members 19 and 20, respectively. Intermediate portion 28 of the curved member 19 extends radially between the rim-engaging portion 24 and tire supporting portion 26. Intermediate portion 29 of the curved member 20 extends between the rim-engaging portion 25 and tire support portion 27.

The tire support portion 26 has a generally cylindrical, radially outer supporting surface 32 for engaging the surface of the tire 17 in the deflated condition. This supporting surface 32 may be a surface of revolution about axis A having a substantially constant radius R circumferentially of the support member 18, as shown in FIG. 1. The curved member 20 also has a generally cylindrical, radially outer supporting surface 33 for engagement with the inner surface of the tire 17 in the deflated condition. The outer supporting surface 33 may also be a surface of revolution about axis A and having the same radius R as the radius of the surface 32.

Referring to FIG. 1, tire support portion 26 of curved member 19 has end portions 34 and 35. Tire support portion 27 of curved member 20 has end portions 36 and 37. Brackets 38 and 39 are bolted on the rim-engaging portion 24 of curved member 19. Brackets 42 and 43 are bolted to rim-engaging portion 25 of curved member 20. The bracket 38 is bolted to the bracket 42 and the bracket 39 is bolted to the bracket 43 to provide the annular support member 18. In the bolted condition, slots 44 and 45 are provided between the end portions 34 and 36 and end portions 35 and 37, respectively, so that the end portions may be deflected independently of one another.

Figure 4:
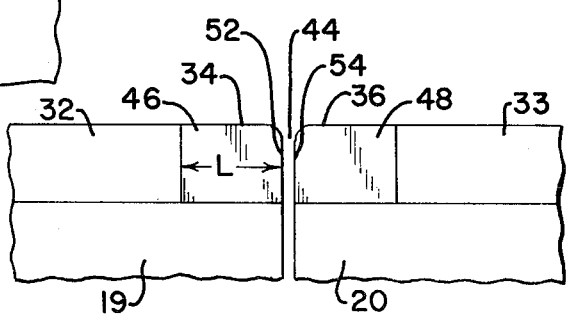
FIG. 4 is a fragmentary elevational view taken along the plane of line 4—4 of FIG. 3.

The end portions 35 through 37 are chamfered to provide radially outer end surfaces 46 through 49, respectively. As shown in the drawings, the end surface 46 is relatively flat and is spaced from the axis A a distance D which is less than the radius R of the surface 32 by an amount (x). This difference (x) measured at an edge 52 of end portion 34 is preferably great enough to provide an end surface 46 having a circumferential length extending over an angle (a) of at least 9 degrees, as shown in FIG. 4.

In the present embodiment, the circumferential length L of the end surface 46 is approximately 1½ inches. The radius R of the supporting surface 32 is 10.37 inches and the distance D from the edge 52 to the axis A is 10.29 inches providing a chamfer or difference (x) of 0.08 inches. These dimensions are for a standard 15-inch tire. The slots 44 and 45 have a width of approximately ¼ inch. The same dimensional relationships apply to the other end portions 35, 36 and 37 at the corresponding edges 53, 54 and 55, respectively.

To install the safety support assembly 10, the tire bead portion 15 is pulled over the flange of the rim 11 using the wheel well 12 and then moved out of the wheel well onto the rim adjacent the bead seat portion 13. The curved members 19 and 20 with the brackets 38, 39, 42 and 43 mounted thereon are then placed in the wheel well 12 and bolted together, as shown in FIG. 1. The bead portion 16 is then pulled over the flange of the rim 11 using the wheel well 12 and the space next to the rim-engaging portions 24 and 25 to provide the necessary clearance for mounting of this bead portion. The tire 17 is then inflated in a manner well known in the art by a valve (not shown) extending through the rim 11.

During normal operation of the inflated tire 17, the tread portion 23 will deflect but will not engage the tire support portions 26 and 27 of the curved members 19 and 20. Upon deflation of the tire 17, the tread portion 23 will engage the tire support portions 26 and 27 of the curved members 19 and 20 as shown in FIGS. 1 and 2. Deflection in the radial direction of the tire support portions 26 and 27 of the curved members 19 and 20 will then take place to cushion the vehicle as the tire 17 and safety support assembly 10 rotate with the wheel rim 11.

Referring to FIGS. 1 and 2, the tire support portions 26 and 27 equally support the load transmitted through the support member 18 to the tread portion 23 of the tire 17 in the position shown. As the tire 17 rotates in a clockwise direction indicated by the arrow in FIG. 1, all of the load will be transferred from curved member 19 to curved member 20 deflecting the tire support portion 27 of curved member 20. When the rotation of the tire 17 and safety support assembly 10 continues to the point where the load is carried by end portion 36 of tire support portion 27, then the load will be transferred to the end surface 46 at the end portion 34 of curved member 19 without generating an excessive stress in the edge 52 of end portion 34. There will be a vibration and possibly noise generated because of the relatively flat end surfaces 46 through 49. This is desirable, however, to warn the driver that the tire 17 is being operated in a deflated condition. It will be seen that regardless of which direction the tire 17 and safety support assembly 10 are rotated, the same mitigation of stress at the end portions 34 through 37 will be provided. There will also be a warning vibration and noise generated to warn to the operator.

While certain representative and details have been shown for the purpose of illustrating the invention, it will be apparent to those skilled in the art that various changes and modifications may be made therein without departing from the invention.

What is claimed is:

1. A segmental, annular tire safety support for use on a rim of a wheel rotatable about an axis and supporting a pneumatic tire mounted thereon in a deflated condition comprising at least two circumferentially spaced segments, each of said segments including a segmental curved member mountable on a wheel rim inside the tire, each said curved member being comprised of generally rigid material and including a rim-engaging portion, an axially extending tire support portion spaced radially outward from said rim-engaging portion for supporting a portion of the tire from the inside thereof when deflated and an intermediate portion joining said rim-engaging portion and said tire support portion, each said tire support portion being radially deflectable when a radial load is applied thereto by engagement with a deflated tire, each of said segments having spaced-apart end portions and a generally cylindrical, radially outer supporting surface of revolution with a substantially constant radius circumferentially of said curved member between said end portions, radially outer end surfaces at said end portions, said safety support further comprising means connecting adjacent end portions of said segments, said means being spaced below the deflection range of said end surfaces, said end surfaces being spaced from said axis a distance less than the length of said radius of said supporting surface, said end surfaces being spaced from said axis in an amount which is great enough to provide relatively flat end surfaces of a size which will distribute the load over the end portions and generate vibration and noise during operation of said tire in the deflated condition, said vibration and noise being sufficient to be communicated to the vehicle operator to indicate the end surfaces have a sufficient size to prevent failure of said intermediate portions by distribution of the load over the end portions.

2. An annular tire safety support according to claim 1 wherein said end portions have radially outer end edges at the ends of said curved member and said end edges are spaced from said axis a distance less than the length of said constant radius.

3. An annular tire safety support according to claim 2 wherein said distance from said axis to said end edges is at least 0.08 inches less than the length of said constant radius.

4. An annular tire safety support according to claim 1 wherein the circumferential length of each of said radially outer end surfaces at said end portions is around 1½ inches.

5. An annular tire safety support according to claim 1 wherein the circumferential length of said radially outer end surfaces at each of said end portions extends circumferentially over an arc of at least 9 degrees.

* * * * *